United States Patent [19]

Bassell

[11] 4,311,071
[45] Jan. 19, 1982

[54] SCREW DRIVER AND SCREW HEAD SYSTEM

[76] Inventor: Marvin Bassell, 192-20B-67th Ave., Fresh Meadows, N.Y. 11365

[21] Appl. No.: 117,067

[22] Filed: Jan. 31, 1980

[51] Int. Cl.³ .............................................. B25B 15/00
[52] U.S. Cl. ....................................... 81/436; 81/451; 411/406; 411/408
[58] Field of Search .................. 81/436, 451; 411/408, 411/406, 407, 402

[56] References Cited

U.S. PATENT DOCUMENTS

| 1,479,506 | 1/1924 | Kellemen | 81/436 |
| 3,253,625 | 5/1966 | Oestereicher | 81/436 |
| 3,673,912 | 7/1972 | Herr | 81/436 |

FOREIGN PATENT DOCUMENTS

| 2338412 | 8/1977 | France | 81/436 |
| 671087 | 4/1952 | United Kingdom | 81/436 |

Primary Examiner—Donald R. Schran
Assistant Examiner—J. T. Zatarga
Attorney, Agent, or Firm—Eliot S. Gerber

[57] ABSTRACT

A screw driver has a handle, shaft and blade with the bottom edge of the blade being flat and having flat sides which incline inwardly from the bottom edge. To turn the screw, the screw driver is placed with its bottom edge in the gap between protruding (raised) quadrant sectors of the screw head and turned 45°. The flat inwardly inclined sides of the screw driver act against cut-back flat sides of the protruding sectors to cam the screw driver toward the screw head and rotate the screw.

3 Claims, 6 Drawing Figures

SCREW DRIVER AND SCREW HEAD SYSTEM

BACKGROUND OF THE INVENTION

1. Field of the Invention

The present invention relates to fastener devices and more particularly to a screw driver and screw head system.

2. Discussion of the Background of the Invention

Screws are one of the most widely used fastener devices. Generally they are made with a shank portion and a head portion. The shank portion is threaded, for example, with a metal or wood screw thread. In the common type of screw the head portion is dome-shaped and has a slot wih straight parallel walls. The screw driver used with such screw heads has a flat bottom edge and opposite slightly outwardly angled sides. To rotate the screw requires that the user exert pressure on the screw driver, both in a rotative direction and toward the screw head, to retain the blade in the slot. Frequently, when the screw is difficult to turn, the blade has a tendency to be forced out of the screw head slot by the rotative pressure on the screw driver.

The field of screw head designs and special forms of screw drivers is crowded with hundreds, if not thousands, of attempts to provide a screw head-screw driver system which is relatively low in cost and yet may provide a firm and secure turning force on the screw. For example, the "Phillips" (trademark) screw head and screw driver system utilizes a cruciform screw head impression to provide such an improved contact. A number of proposed screw head designs, some of which are discussed below, have suggested the use of a screw head slot having one or more undercut walls and a screw driver blade having an outwardly angled foot portion. That arrangement provides a cam action when rotative force is applied to the screw driver, which tends to draw (cam) the screw driver blade downwardly (inwardly) toward the screw head. Such cam action permits the user to apply only rotative force, and not pressure, along the screw axis to the screw driver and helps retain the screw driver and screw head in contact during the user's rotation of the screw driver.

The prior art includes the patents discussed below, as well as many others. However, there is still a need for a relatively low cost screw driver-screw head system which will permit the user to apply only rotative force and yet which will retain contact between the screw driver and screw head.

In U.S. Pat. No. 3,897,812 to Arnn for "Screw Driver" the blade has two opposed cut-away portions 24 formed by side ribs 26. The foot portion 28 has "wedge like bites 30" and "is generally isosceles trapezoidal in cross-section" and with "a flat base 32" (column 2, lines 38-42).

Another patent to Arnn, U.S. Pat. No. 3,923,088 for "Biting Screw Driver", has the cross-sectional view of the foot portion being curved (FIG. 3) or "generally isosceles trapezoidal" in shape with a flat base (FIGS. 6,10) and with a center blade bulbous portion (FIGS. 5–7) or cut-away portions, i.e., indentations (FIGS. 8–11). The screw driver is for use with standard screw heads whose slots have straight vertical walls, as shown in FIGS. 12,13 of the Arnn U.S. Pat. No. 3,923,088, and see its column 1, lines 23-26.

U.S. Pat. No. 3,695,321 to Garehime for "Cavity Head Screw and Driving Tool Therefor" shows a screw head having a complex geometry which may be difficult to produce at a low cost. It has a central cavity and two partial slots whose walls converge (as seen in top view) and are undercut (as seen in side view).

In U.S. Pat. No. 2,792,039 to Wing for "Slotted Screw Head and Driver Therefor Having Non-Burring Engagement", and in U.S. Pat. No. 2,677,985 to Vaughn for "Slotted Screw Head", a screw driver having an arcuate bottom edge fits in an arcuate slot having flat and parallel side walls which are then undercut to form four rounded undercut portions. The screw head may appear to be relatively complex and costly.

The U.S. Pat. Nos. 3,120,251 and 3,026,920, both to York for "Screwdriver", like the Wing patent, show a screw driver having an arcuate bottom edge which fits into a screw head slot having an arcuate bottom and which may have undercut side walls.

In U.S. Pat. No. 2,800,936 to West for "Cruciform Screw Driver" there is shown a type of cross recess having a center cavity and opposed undercut and overcut side walls.

In U.S. Pat. No. 2,684,094 to Lissy for "Nonslip Screw Driver and Screwhead", a screw driver has a protruding bottom "flared projections 17 and 18" which fit into undercut spaces 15,16 of the walls of a screw head slot. The projections act only when the screw driver is rotated in one direction (clockwise as in FIG. 2) and have no effect when the screw driver is reversed in direction.

"One-way" screws are employed when it is desired to screw in the screw using an ordinary screw driver, but removal using such a screw driver is not possible. For example, such screws may be used to fasten lock plates to doors. One type of "one-way" screw has a head without a slot, but divided into four sectors about a common center. Two opposed sectors are raised and have straight walls facing in the same rotative direction and about 360° apart. The straight wall sectors are separated by sectors in the form of ramps. The screw may be inserted by the screw driver blade being turned clockwise and pushing on the two straight walls. When the screw driver is rotated counterclockwise it rides upward on the ramps and does not turn the screw.

OBJECTIVES AND FEATURES OF THE INVENTION

It is an objective of the present invention to provide a screw head and screw driver system in which the user's entire force may be applied to rotate the screw and the co-action of the screwdriver and screw head will act to maintain them in contact.

It is an objective of the present invention to provide such a screw and screw driver system in which the user's rotative force on the screw driver is resolved by the cam action between the screw head and the screw driver into force toward the screw head, both for insertion and removal of the screw, and which will permit the screw to be turned when there is limited vertical access to the screw head.

It is an objective of the present invention to provide such a screw and screw driver system in which the screw head may be economically produced using high-speed conventional metal working machinery and the screw driver may also be relatively low in cost.

It is an objective of the present invention to provide such a screw and screw driver system in which, after the screw driver blade is positioned in the screw head, it may be locked in position by a slight clockwise rotation of the screw driver and, after the screw is fastened, may be unlocked by a slight counterclockwise rotation; and for removal of the screw counterclockwise rotation of the screw driver locks it in position on the screw head, and after the screw is removed slight counterclockwise rotation releases it from the screw head.

It is an objective of the present invention to provide such a screw and screw driver system in which the screw head may be utilized on wood screws, sheet metal screws and machine screws as well as on other types of screws.

It is a feature of the present invention to provide a screw and screw driver system in which the screw comprises a shank portion having an exterior thread, a head portion, and an imaginary central axis. The head portion has a plateau portion connected to the shank and two opposed raised protruding portions (sectors) equidistant from the axis and in, but not filling, opposite quandrants of said plateau portion, the closest distance between them being D. Each of the protruding portions has two flat side walls perpendicular to each other, with each side wall being parallel to a side wall of the opposite protruding portion. The distance between the parallel side walls along an imaginary line perpendicular thereto and meeting an imaginary extension of one side wall is E+E'. Each of the side walls is cut back so that they are angled inwardly toward the axis. The other two opposite quandrants of the plateau portion are flat and lie in a single plane.

The screw driver fits against the screw head portion and comprises a handle portion, a shank portion and a blade portion. The blade portion has a flat bottom edge with a width W, two flat opposed cam sides starting at the bottom edge and angled inwardly therefrom, and two flat opposed side walls angled outwardly from the top of the cam sides. The blade width W is less than the gap D and greater than the side wall distance E+E'.

BRIEF DESCRIPTION OF THE DRAWINGS

Other objectives and features of the present invention will be apparent from the following detailed description of the inventor's best mode of practicing the invention. The detailed description should be taken in conjunction with the accompanying drawings.

In the drawings.

DETAILED DESCRIPTION OF THE INVENTION

The present invention involves a screw having a conventional shank portion and a special constructed head portion of a screw driver having a special construction which is utilized in connection with that screw.

Figure 1:
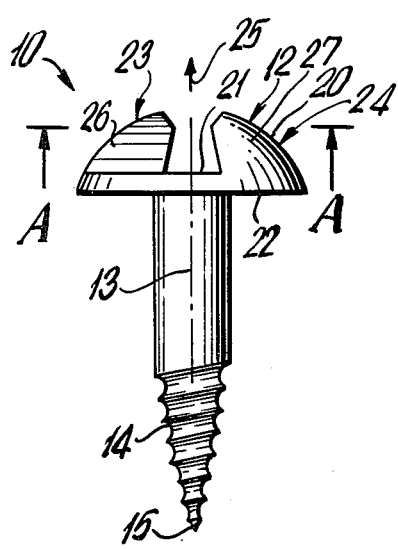
FIG. 1 is a side plan view of the screw utilized in the present invention.

As shown in FIG. 1, the screw 10 comprises generally a shank portion 11 and a head portion 12, both of which are formed along a common central axis 13. The shank portion 11 is of conventional construction and has, in the embodiment shown in FIG. 1, a wood screw thread 14 at its lower end, terminating in a point 15. Alternatively, and not shown, the shank portion 11 may have other types of threads such as a machine thread for fitting into a machine part or nut or a sheet metal screw thread.

Figure 2:
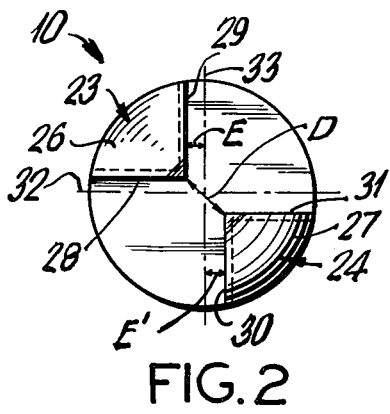
FIG. 2 is a top plan view of the screw of FIG. 1.
Figure 3:
FIG. 3 is a cross-sectional view of the screw taken along line A—A of FIG. 1 looking in the direction of the arrows.

The head portion 12 comprises a round disk-like portion 20 having a flat top 21 and a flat bottom 22. As seen in top view, it is divided into four equal sectors (quandrants). Two protruding sectors (bosses) 23 and 24, respectively, are integral with the top portion 20 and protrude therefrom in the direction of the arrow 25. As shown in FIGS. 1 through 3, each of the sectors 23,24 may be formed from a dome and consequently has an arcuate outer face, respectively 26,27. Each of the protruding sectors 23,24 has two side walls, respectively side walls 28,29, in the case of portion 23, and side walls 30,31 in the case of portion 24. The side wall 28 is perpendicular (90° angle) to the side wall 29 and the side wall 30 is perpendicular (90° angle) to the side wall 31. The side walls are canted, i.e., undercut, in relation to the axis 13, so that they act as camming members. The side walls 28, 29, 30 and 31 are flat.

An imaginary set of cross lines 32,33 may be drawn so that they cross at the axis 13, are perpendicular to one another, and are in a single plane on the surface of the top member 20. The walls 28, 29, and 30,31 are set back from these imaginary lines 32,33. The points of the protruding sectors 23,24 are chamfered (cut off) at 34,35, or they may be rounded, so that the screw head does not have sharp points.

The minimum distance between the protruding sectors 23 and 24 is labeled D. The distance between the imaginary cross line 33 and the top edge of the protruding sector 23 closest to that line is labeled E. Similarly, the distance between the imaginary cross line 33 and the top edge of the protruding sector 24 (the edge closest to that line) is labeled E'. There is a certain critical relationship between the distances D and E' and E and the size and shape of the screw driver, which will be explained subsequently.

Figure 4:
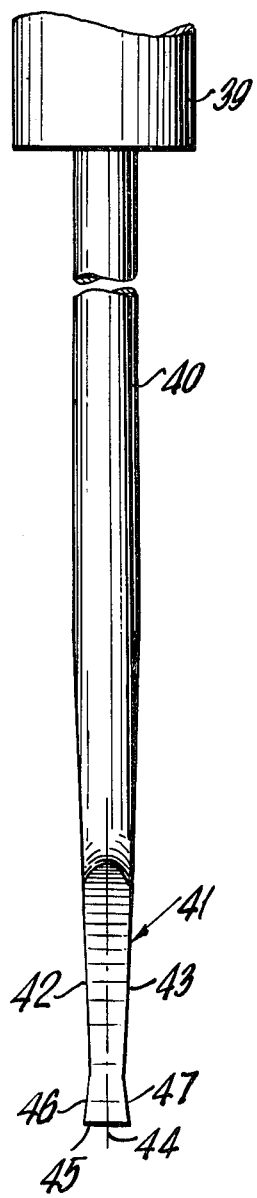
FIG. 4 is a side plan view of a portion of the shank portion and its blade of the screw driver utilized in the present invention.
Figure 5:
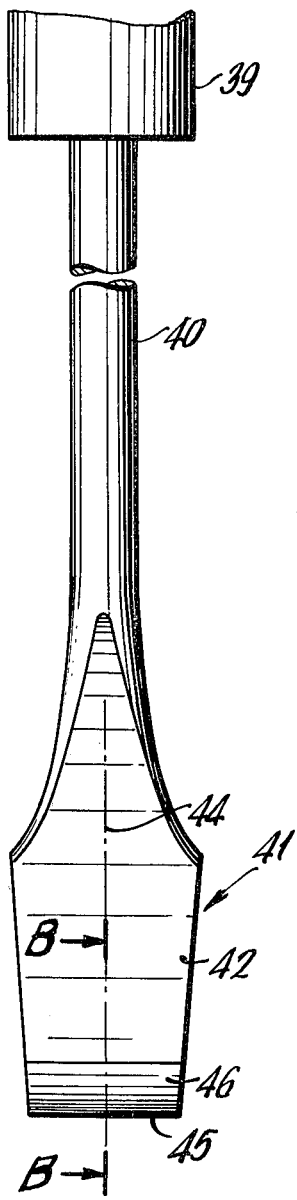
FIG. 5 is a front plan view of the portion of the screw driver in FIG. 4.
Figure 6:
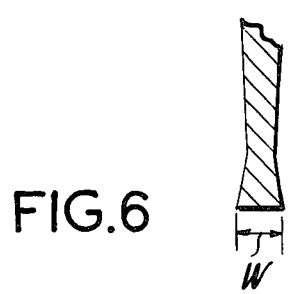
FIG. 6 is a cross-sectional view taken along line B—B of FIG. 5 looking in the direction of the arrow.

The screw driver utilized in the present invention is shown in FIGS. 4 through 6. The screw driver includes a handle portion 39, which may be of conventional construction, a shank portion 40, which may be round and of conventional construction, and a blade portion 41. The blade portion 41 comprises two flat opposite sides 42 and 43 which are angled inwardly in relationship to the central imaginary axis 44 in the direction toward the bottom end of the blade portion. The blade portion has a flat bottom 45 and two opposite sides 46,47 which are angled inwardly towards the axis 44 starting at the bottom 45. The blade is uniform in cross-section, a cross-section thereof being shown in FIG. 6.

The width of the flat bottom 45 of the blade portion is W (see FIG. 6). The width W is greater than the combined distances E and E'. Consequently, one cannot connect the screw driver and the screw head of FIGS. 1–3 by bringing the blade so that the length of its flat bottom 45 is aligned (parallel) with the cross line 33. The top innermost edges of the side walls 29 and 30 are too close together to permit the entry of the bottom 45 of the blade portion 41 between those side walls by downward pressure with the blade's length in alignment with the imaginary line 33.

To insert the screw driver of FIGS. 4-6 into the screw head of FIGS. 1-3 the user must insert the bottom width W between the inward ends of the protruding sectors 23 and 24. The distance D between those inward ends is greater than the width W of the bottom of the screw driver blade. Consequently, the screw driver may be inserted so that its bottom 45 rests on the top 21. Such insertion is perpendicular to line D. In the next step the user will rotate the screw driver blade 45° in the clockwise direction so that the sides 46 and 47 of the blade are in contact, respectively, with the side walls 28 and 31. The cut back of the side walls 28 and 31 cooperate with the slant of the sides 46,47 of the blade to provide a camming action. Only rotational force need be applied to the screw driver in order to maintain contact between the screw driver blade and the screw head. Alternatively, after insertion of the screw driver blade between the protruding sectors, i.e., with the length of the bottom 45 perpendicular to the line D, the blade may be turned 45° in the counterclockwise direction to loosen the screw, i.e., to turn it counterclockwise. In either case, the blade may be removed from the screw head by placing the length of the bottom 45 perpendicular to the line D. It may be removed as its width F is less than the distance D. In the abovedescribed system it is critical that $D > F$ and $D > E + E'$ and $E + E' > W$.

Modifications may be made within the scope of the present invention. For example, the handle and elongated shank of the screw may be replaced by a shank and head (handle portion) that will fit into a tool, such as a ratchet tool. A ratchet tool equipped with the screw driver blade portion of the present invention may be used to insert or remove the abovedescribed screws when there is limited access in the direction of the screw axis. The screw may be turned by a tool lying in the same plane as the bottom face of the screw head.

What is claimed is:

1. A screw and screw driver system in which the screw comprises a shank portion having an exterior thread, a head portion and an imaginary central axis;

the head portion having a plateau portion connected to said shank portion and two opposed raised protruding portions equidistant from said axis and in opposite quadrants of said plateau portion, the closest distance between said protruding portions being the gap D;

each of said protruding portions having two flat side walls prependicular to each other, each side wall being parallel to a side wall of the opposite protruding portion, with the longest distance between the parallel side walls along an imaginary line perpendicular thereto and meeting an imaginary extension of one side wall being $E + E'$;

each of said side walls being undercut so that they are angled inwardly relative to said axis;

the other two opposite quadrants of said plateau portion being flat and lying in a single plane;

the screw driver fitted against said screw head portion to apply rotative force thereto comprising a handle portion, a shank portion and a blade portion;

said blade portion having a flat bottom edge with a width W, two flat opposed cam sides starting at said bottom edge and angled inwardly therefrom, and two flat opposed side walls angled outwardly from the top of said cam sides;

wherein said blade width W is less than the gap D and greater than the side wall distance $E + E'$.

2. A screw comprising a shank portion with an exterior thread, a head portion, and an imaginary central axis;

the head portion having a plateau portion connected to said shank portion and two opposed protruding sector portions equidistant from said axis and centered in opposite quadrants relative to said axis;

each of said protruding sectors having two flat side walls perpendicular to each other, each of said side walls being undercut so that they are angled inwardly relative to said axis;

the other two opposite quadrants of said plateau portion being flat and lying in a single plane.

3. A screw as in claim 2 wherein the extremities of the protrusion sectors closest to the axis are chamfered so as not to form sharp points and to aid insertion of the screw driver between those extremities.

* * * * *